United States Patent [19]

Thomas

[11] 4,405,872
[45] Sep. 20, 1983

[54] METHOD AND APPARATUS FOR GENERATING ELECTRICAL ENERGY FROM THE ROTATION OF A WHEEL

[76] Inventor: Stephen E. Thomas, 196 Patricia Way, Grass Valley, Calif. 95945

[21] Appl. No.: 239,624

[22] Filed: Mar. 2, 1981

Related U.S. Application Data

[63] Continuation-in-part of Ser. No. 940,351, Sep. 7, 1978, abandoned.

[51] Int. Cl.³ .............................................. H02K 7/10
[52] U.S. Cl. .............................. 310/75 R; 310/75 A; 322/3; 290/1 R
[58] Field of Search .............. 310/15, 69, 75 R, 75 A; 322/3; 290/1

[56] References Cited

U.S. PATENT DOCUMENTS 3,699,367 10/1972 Thomas .................................. 310/69
4,220,907 9/1980 Pappas et al. ........................ 310/154

Primary Examiner—Donovan F. Duggan
Attorney, Agent, or Firm—Paul L. Hickman

[57] ABSTRACT

Both a method and an apparatus for generating electrical energy from the rotation of a wheel are disclosed. The apparatus is disposed within a pneumatic tire of a non-magnetic wheel and includes a non-magnetic support track circumferentially attached around the wheel, at least one coil positioned along the track, a magnet slidably engaging the track, and an actuator attached to the magnet for developing a drag upon the magnet to cause relative motion between the magnet and coil as the wheel is rotated.

8 Claims, 6 Drawing Figures

METHOD AND APPARATUS FOR GENERATING ELECTRICAL ENERGY FROM THE ROTATION OF A WHEEL

CROSS-REFERENCES TO RELATED APPLICATIONS

The present patent application is a continuation-in-part of copending patent application Ser. No. 940,351 which was filed 09/07/78, now abandoned, by Stephen E. Thomas, and which was entitled METHOD AND APPARATUS FOR GENERATING ELECTRICAL ENERGY FROM THE ROTATION OF A WHEEL.

BACKGROUND OF THE INVENTION

1. Field of the Invention

This invention relates generally to electric generators and more particularly to electrical generators powered by utilizing part of the mechanical energy of a rotating wheel.

2. Description of the Prior Art

It is often desired to have a source of electrical power present at the wheels of a car, truck, or other motorized vehicle. For example, electronic wheel monitoring devices used to detect tire underinflation or tire overheating require a local, dependable source of electrical power. Other devices designed to improve the appearance, performance, or safety of the vehicle, such as wheel rim lights, also require a source of electrical power at the wheels.

A conventional solution to this problem has been to run wires from the vehicle's battery, or from an auxilliary battery, to each of the wheels. A disadvantage with this solution is that a commutator is required to transfer the electrical power from the wires attached to the vehicle's stationary frame to the devices attached to the rotating wheels. As is the case with all mechanical devices with moving parts, commutators have a tendency to wear, malfunction, and eventually fail.

If an auxilliary battery is used another problem that can occur is that the battery might become discharged unbeknownst to the vehicle operator. If the operator was acting in reliance to devices powered by the auxilliary battery potentially dangerous situations might occur.

In an attempt to overcome the above mentioned problems, various types of electrical generators have been coupled to the wheels of a vehicle. For example, one type of generator is coupled directly to the wheel axle and another type has a small friction wheel which contacts the vehicle's tire and rotates with it. A problem with external generators of this type is that, again, it is necessary to utilize commutators to couple the generator's output to devices affixed to the rotating wheels.

In U.S. Pat. Nos. 3,699,367 and 3,760,351, Stephen E. Thomas discloses two generators that fit within the tire of a car's wheel so as to be able to directly power sensors, monitors, or other devices disposed therein. One advantage of Thomas' devices is that the need for a commutator is eliminated.

SUMMARY OF THE INVENTION

It is a major object of this invention to provide an apparatus that can be disposed within the tire of a wheel and which can generate sufficient electrical energy to power sensors and/or other devices.

It is a further object of this invention to provide an inexpensive, mechanically simple, and reliable apparatus in accordance with the above object.

Briefly, the invention comprises a non-magnetic support track that is circumferentially affixed around a non-magnetic wheel rim, at least one coil attached proximate a fixed point along the support track, a magnet slidably coupled to the support track, and an actuator member coupled to the magnet for producing a drag upon the magnet as the wheel is rotated. Due to the drag caused by the actuator, the magnet is prevented from rotating with the wheel and thus a relative motion is introduced between the magnet and the coil. Thus, as the wheel rotates a usable amount of electrical energy is generated in the windings of the coil.

An advantage of this invention is that there are very few moving parts to wear, jam, or malfunction.

Another advantage of this invention is that no commutators of any kind are needed since electrical energy is generated within the tire itself.

These and other objects and advantages of the present invention will no doubt become apparent upon a reading of the following descriptions and a study of the several figures of the drawing.

DETAILED DESCRIPTION OF THE PREFERRED EMBODIMENT(S)

Figure 1:
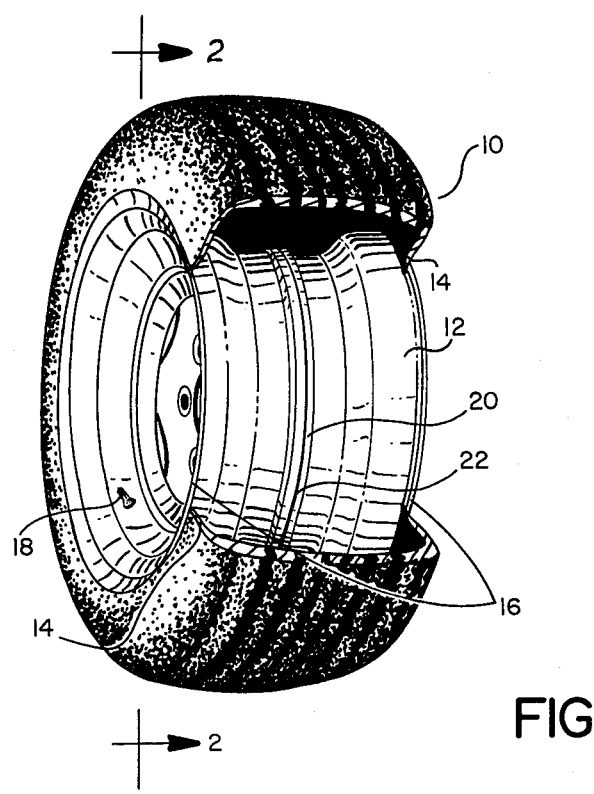
FIG. 1 is a partial view of the apparatus of the present invention shown attached circumferentially around a wheel rim and within a tire.

In FIG. 1, a wheel of a car, truck or other vehicle is shown to include a tire 10 mounted on a non-magnetic wheel rim 12. Tire 10 is substantially an internally opening, toroidal tube having a pair of beads 14 which engage with a pair of rim flanges 16 of the wheel rim. As can be seen, the outer peripheral surface of the wheel rim tapers inwardly towards its center so that the central circumference of the rim is substantially less than the circumference as measured at flanges 16. Tire 10 is normally inflated by forcing air through a valve 18 that extends through the wheel rim.

Figure 2:
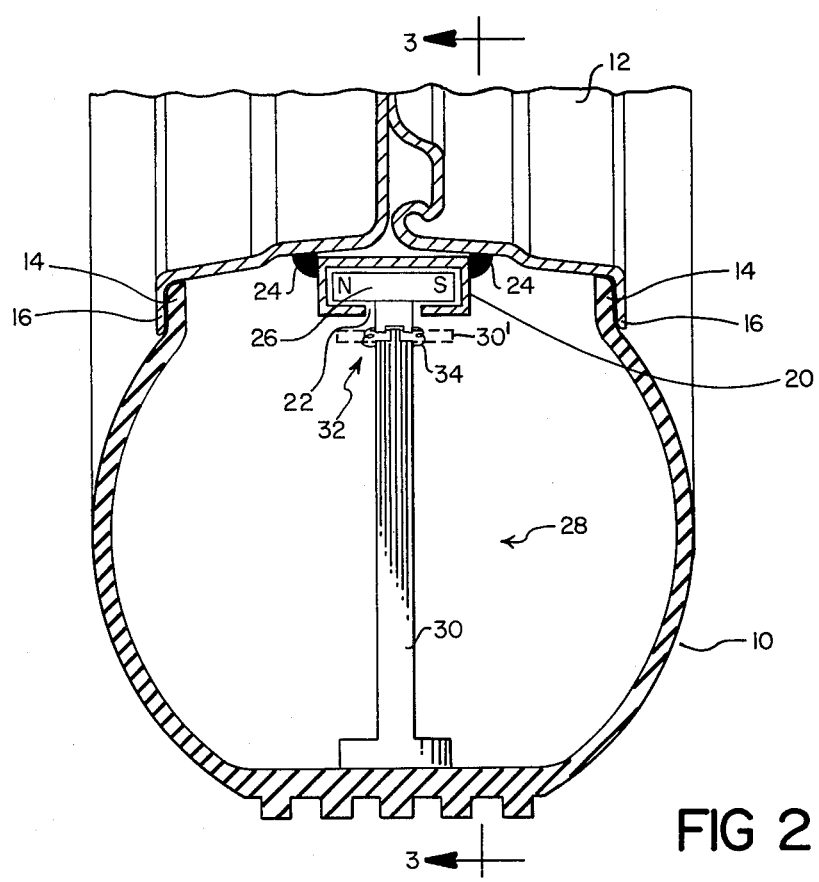
FIG. 2 is a sectional view taken along line 2—2 of FIG. 1.

Referring now additionally to FIG. 2, the apparatus of the present invention includes a non-magnetic track 20 that is circumferentially attached around a central portion of wheel rim 12. In this embodiment, support track 20 is a substantially closed tubular member having a cavity of rectangular cross-section and having a circumferential slot 22 formed along its outer periphery. The track is attached to the wheel rim at 24.

The track is, highly preferably, constructed from a non-magnetic material such as aluminum or plastic. This is because a track constructed from a magnetic material, such as steel, would attract a magnet 26 too strongly and thus possibly create a prohibitive amount of friction between the magnet and the track. While the magnet might still slide along a steel track, friction losses would reduce the efficiency of this apparatus.

Permanent magnet 26 is slidably disposed within the cavity of the track. Extending through slot 22 to attach to the magnet is a drag producing member 28 including an actuator 30, a hinge 32 and a spring 34 which normally biases actuator 30 towards the support track to assume the position suggested at 30'. When the actuator is in the position shown at 30', the apparatus of the present invention is well protected against damage, even in the eventuality of a tire failure, because the entire apparatus is below the outermost extension of the rim flanges.

Figure 3:
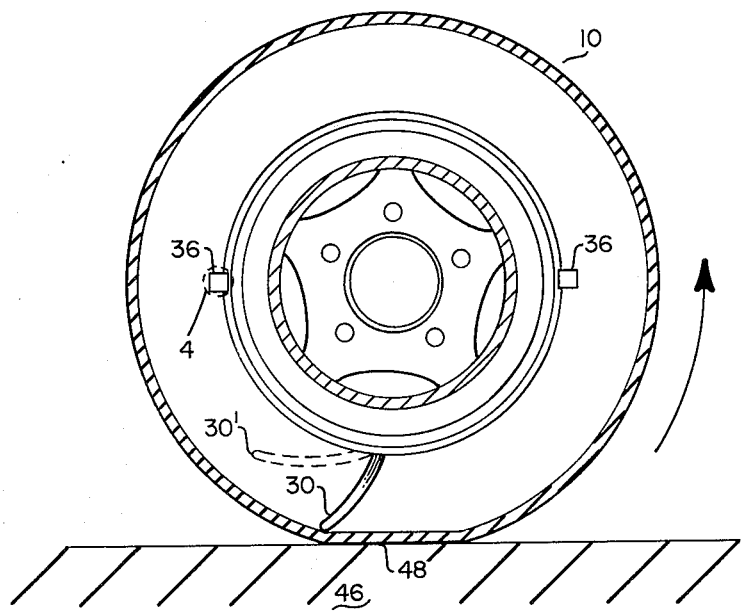
FIG. 3 is a sectional view taken along line 3—3 of FIG. 2.
Figure 5:
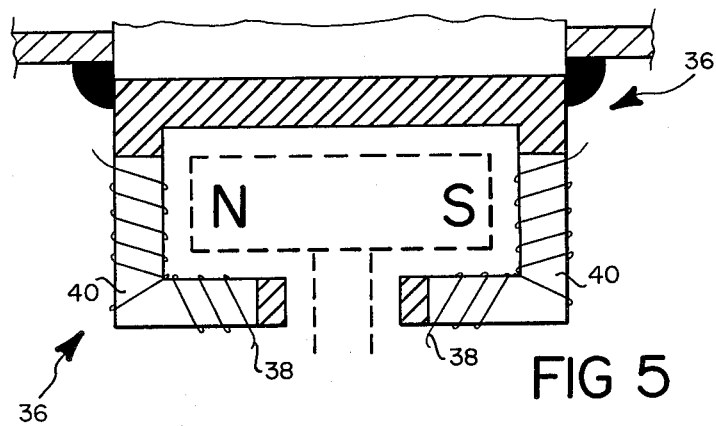
FIG. 5 is a partial cross-sectional view taken along line 5—5 of FIG. 4.
Figure 4:
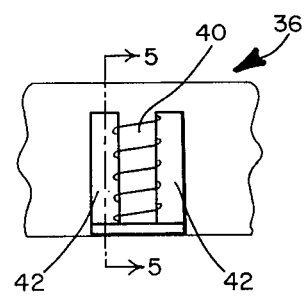
FIG. 4 is an elevational view of the small section of the support track encircled by broken line 4 of FIG. 3.

Referring now to FIGS. 3, 4, and 5, the apparatus further includes one or more wire coils 36, which can be attached directly to the support track. In this embodiment, a coil 36 can be seen to comprise a length of wire 38 that is wrapped around a portion 40 of the track through slots 42 created by removing two small "L" shaped sections from the track.

There are, of course, many different ways of attaching a coil to the track, including riveting or otherwise attaching a pre-formed or commercially available coil to a section of the track or to the wheel rim proximate to the track. Even though such a coil would probably include an iron core for the sake of efficiency, the positioning and configuration of the coil is chosen to minimize friction producing magnetic attraction.

With reference to all of the figures, but with particular reference to FIG. 3, the operation of the present invention is believed to be as follows. When a tire 10 is in contact with a support surface 46, such as a road, a flattened region 48 is created on the tire at its point of contact with the surface. At this point of contact the tire has a "stressed" radius that is less than the normal or "unstressed" radius of the tire. As the wheel is rotated regions along the peripheral surface of the tire become progressively flattened as they contact the ground.

When the wheel begins to pick up rotational speed the actuator will, due to the influence of centrifugal force, attempt to extend radially outwardly from the wheel rim. Since the actuator is made so that it has a length which is less than the stressed radius of the tire, the free end of the actuator will engage the inside of the tire 10 at the flattened region. Consequently, permanent magnet 26 will not be able to rotate with the wheel and should be substantially rotationally immobilized. Since the coils 36 rotate with the wheel they move past and through the magnetic flux developed by the magnet, generating an electrical potential. It should be apparent that complete immobilization of the magnet is not necessary to the functioning of this apparatus since any difference in rotational speed between of magnet and the coils will generate a potential across the leads of the coil.

The electrical energy developed in the coils can be used to power pressure or temperature sensors mounted upon or within the wheel. Preferably the sensors are coupled to miniature transmitters which can relay the conditions sensed within the tire to a receiver/display device attached to the dashboard of the vehicle. Alternatively, the electrical energy generated by the apparatus, or signals developed by devices powered by this apparatus, could be brought out of the tire via the valve stem (which is already insulated from the rim).

Figure 6:
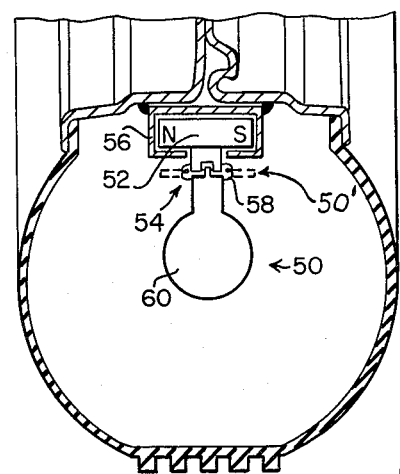
FIG. 6 is a cross-sectional view of an alternate embodiment of the apparatus of the present invention.

Referring now to FIG. 6, an alternate construction for the actuator of the drag producing member is shown. In this embodiment an actuator 50 having a short, widened body is coupled to a magnet 52 by a hinge assembly 54 and is normally biased towards a support track 56 by a spring 58 so that it assumes a position as shown at 50'.

In operation, when the wheel begins to rotate centrifugal force causes actuator 50 to attempt to extend radially outwardly from the wheel rim against the pressure of spring 58. When in this extended position the widened body of the actuator is subjected to a measurable wind resistance due to the difference in rotational velocity between the wheel and the air within the tire of the wheel. It is this wind resistance that produces the drag upon magnet 52 required for the relative motion between the magnet and coils. Again, it is not necessary to immobilize the magnet relative the coils since any relative motion between the two will generate electricity.

It is presently believed that the difference in rotational velocities between the air within the tire and the wheel is due to a "standing shock wave" which ripples through the trapped air due to the flexing and unflexing of the tire. It is contemplated, however, that the difference in velocity may also be due to other, and as yet unknown, factors.

The method for generating electrical energy in accordance with the present invention includes the steps of attaching a non-magnetic support track circumferentially around a non-magnetic wheel rim, attaching at least one coil of wire to the support track, slidably coupling a permanent magnet to the track, attaching a drag-producing member to the magnet, and rotating the entire wheel. As the wheel rotates the drag producing member prevents the magnet from fully rotating with the support track so that the coil and magnet are repeatedly moved pass one another and thus generating electrical energy in the coil.

While this invention has been described in terms of a few preferred embodiments, it is contemplated that persons reading the preceding descriptions and studying the drawing will realize various alterations, permutations and modifications thereof. For example, it is possible to slidably couple coils to the support track and to attach magnets around the support track. Furthermore, the construction of the actuator member can vary considerably. For example, a flexible actuator (perhaps constructed from a teflon coated plastic) that has a predisposition to bend upwardly towards the track can be substituted for the rigid, hinged actuators discussed above.

It is therefore intended that the following appended claims be interpreted as including all such alterations, permutations and modifications as fall within the true spirit and scope of the present invention.

What is claimed is:

1. An apparatus for generating electrical energy from the rotation of a wheel comprising:
    an electric generation pair including a means which develops a magnetic flux and another means which, when cut by said lines of magnetic flux due to relative motion between the pair, generates electrical energy;
    a non-magnetic support track circumferentially affixed to a non-magnetic wheel rim and within a tire associated with said wheel;
    attachment means for attaching a first means of said electric generation pair proximate at least one fixed point of said support track;

means for slidably coupling a second means of said electric generation pair to said support track; and drag producing means attached to said second means.

2. An apparatus as claimed in claim 1 wherein said first means includes at least one electric coil and wherein said second means includes a permanent magnet.

3. An apparatus as claimed in claim 2 wherein said coil includes a length of wire wrapped around a slotted portion of said support track.

4. An apparatus as claimed in claim 2 wherein said drag producing means includes an actuator member, hinge means attaching said actuator member to said magnet, and spring means for biasing said actuator member towards said support track.

5. An apparatus as claimed in claim 4 wherein said actuator member has an elongated body with a length that is less than the unstressed radius of said tire and greater than the stressed radius of said tire, whereby said elongated body can engage an inner surface of said tire proximate said stressed radius to introduce a drag force on said magnet.

6. An apparatus as claimed in claim 4 wherein said actuator member includes a widened body portion having a maximum dimension less than the stressed radius of said tire, whereby said widened body causes a drag on said magnet as said wheel is rotated due to the wind resistance within said tire.

7. An apparatus as claimed in claim 4 wherein said support track includes a substantially closed channel member extending circumferentially around said wheel rim and having a circumferential slot around its outer peripheral surface, whereby said magnet is disposed within the cavity of said channel member and said drag-producing member extends through said slot and attaches to said magnet.

8. A method for generating electrical energy comprising:

attaching a non-magnetic support track circumferentially around a non-magnetic wheel and within a tire associated with said wheel;

coupling a coil to said wheel in proximity to said track;

slidably engaging a permanent magnet with said support track;

attaching a drag producing member to said permanent magnet; and rotating said wheel;

whereby said drag-producing member causes a differential in rotational velocity between said magnet and said coil.

* * * * *